(12) United States Patent
Babcock et al.

(10) Patent No.: US 7,080,349 B1
(45) Date of Patent: Jul. 18, 2006

(54) METHOD OF DEVELOPING OPTIMIZED OPTICAL PROXIMITY CORRECTION (OPC) FRAGMENTATION SCRIPT FOR PHOTOLITHOGRAPHIC PROCESSING

(75) Inventors: Carl Babcock, Campbell, CA (US); Luigi Capodieci, Santa Cruz, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 250 days.

(21) Appl. No.: 10/818,029

(22) Filed: Apr. 5, 2004

(51) Int. Cl.
*G06F 17/50* (2006.01)

(52) U.S. Cl. .............................. 716/19; 716/20; 716/21

(58) Field of Classification Search ................ 716/2–5, 716/8, 10–11, 19–21; 703/13
See application file for complete search history.

(56) References Cited

U.S. PATENT DOCUMENTS

| | | | |
|---|---|---|---|
| 6,243,855 B1 | 6/2001 | Kobayashi et al. | 716/19 |
| 6,381,731 B1 | 4/2002 | Grodd | 716/7 |
| 6,397,372 B1 | 5/2002 | Bozkus et al. | 716/5 |
| 6,415,421 B1 | 7/2002 | Anderson et al. | 716/4 |
| 6,425,113 B1 | 7/2002 | Anderson et al. | 716/5 |
| 6,430,737 B1 | 8/2002 | Cobb et al. | 716/19 |
| 6,643,616 B1 * | 11/2003 | Granik et al. | 703/13 |
| 6,978,438 B1 * | 12/2005 | Capodieci | 716/21 |
| 2002/0078430 A1 * | 6/2002 | Miyazaki | 716/21 |
| 2004/0005089 A1 * | 1/2004 | Robles et al. | 382/141 |
| 2004/0088149 A1 * | 5/2004 | Cobb | 703/13 |
| 2005/0081179 A1 * | 4/2005 | Melvin, III | 716/20 |
| 2005/0198598 A1 * | 9/2005 | Adam | 716/4 |

OTHER PUBLICATIONS

Schellenberg, et al. A New Process Monitor for Reticles and Wafers: The MEEF Meter, Presented at SPIE's Microlithography 2000 Symposium, Feb. 27 to Mar. 3, 2000.

Schulze and Lacour. A GDS-based Mask Data Preparation Flow—Data Volume Containment by Hierarchical Data Processing. Mentor Graphics; Deep Submicron Technical Publications, Nov. 2002.

Torres and Maurer. Alternatives to Alternating Phase Shift Masks for 65nm. Mentor Graphics; Deep Submicron Technical Publications, Nov. 2002.

Torres, et al. Design Verification Flow for Model Assisted Double Dipole Decomposition. Mentor Graphics; Deep Submicron Technical Publications, Sep. 2002.

(Continued)

*Primary Examiner*—Jack Chiang
*Assistant Examiner*—Nghia M. Doan
(74) *Attorney, Agent, or Firm*—Renner, Otto, Boisselle & Sklar, LLP (57) ABSTRACT

A method for developing an optimized layout fragmentation script for an optical proximity correction (OPC) simulation tool. A test pattern layout having at least one structure representing a portion of the integrated circuit layout is provided. Optical proximity correction is iteratively conducted on the test pattern layout for each desired permutation of at least one fragmentation parameter associated with the test pattern layout and, for each permutation, a corrected test pattern layout is generated. A printed simulation of each corrected test pattern layout is made and analyzed to select one of the permutations of the at least one fragmentation parameter to apply to a integrated circuit layout prior to correction with the OPC simulation tool.

20 Claims, 4 Drawing Sheets

OTHER PUBLICATIONS

Capodieci, et al. Effects of Advanced Illumination Schemes on Design Manufacturability and Interactions with Optical Proximity Corrections. Mentor Graphics; Deep Submicron Technical Publications, Sep. 2000.

Cobb and Sahouria. Hierarchical GDSII-based fracturing and job deck system. Mentor Graphics; Deep Submicron Technical Publications, Nov. 2001.

Schellenberg, et al. Impact of RET on Physical Layouts. Mentor Graphics; Deep Submicron Technical Publications, Apr. 2001.

Schellenberg, et al. OPC Beyond 0.18 µm: OPC on PSM Gates. Mentor Graphics. Mentor Graphics; Deep Submicron Technical Publications, Nov. 2001. Presented at SPIE's Microlithography 2000 Symposium Feb. 27-Mar. 3, 2000.

Torres, et al. RET Compliant Cell Generation for sub-130nm Processes. Mentor Graphics; Deep Submicron Technical Publications, Jun. 2002.

Vandenberghe, et al. (Sub-) 100nm Gate Patterning Using 248nm Alternating PSM. Mentor Graphics; Deep Submicron Technical Publications, May 2001.

Granik, et al. Sub-resolution Process Windows and Yield Estimation Technique Based on Detailed Full-chip CD Simulation. Mentor Graphics; Deep Submicron Technical Publications, Sep., 2000.

Schellenberg and Moore. Verifiable OPC Methodologies. Mentor Graphics; Deep Submicron Technical Publications, Mar., 1999.

\* cited by examiner

METHOD OF DEVELOPING OPTIMIZED OPTICAL PROXIMITY CORRECTION (OPC) FRAGMENTATION SCRIPT FOR PHOTOLITHOGRAPHIC PROCESSING

TECHNICAL FIELD

The present invention relates generally to the field of integrated circuit manufacture and, more particularly, to a method of establishing an optimized fragmentation script that can be used by an optical proximity correction (OPC) software tool for correction of a photolithographic pattern layout.

BACKGROUND

The formation of various integrated circuit (IC) structures on a wafer often relies on lithographic processes, sometimes referred to as photolithography, or simply lithography. As is well known, lithographic processes can be used to transfer a pattern of a photomask (also referred to herein as a mask or a reticle) to a wafer.

For instance, patterns can be formed from a photoresist layer disposed on the wafer by passing light energy through a mask having an arrangement to image the desired pattern onto the photoresist layer. As a result, the pattern is transferred to the photoresist layer. In areas where the photoresist is sufficiently exposed and after a development cycle, the photoresist material can become soluble such that it can be removed to selectively expose an underlying layer (e.g., a semiconductor layer, a metal or metal containing layer, a dielectric layer, a hard mask layer, etc.). Portions of the photoresist layer not exposed to a threshold amount of light energy will not be removed and serve to protect the underlying layer during further processing of the wafer (e.g., etching exposed portions of the underlying layer, implanting ions into the wafer, etc.). Thereafter, the remaining portions of the photoresist layer can be removed.

There is a pervasive trend in the art of IC fabrication to increase the density with which various structures are arranged. For example, feature size, line width, and the separation between features and lines are becoming increasingly smaller. For example, nodes with a critical dimension of about 45 nanometers (nm) to about 65 nm have been proposed. In these sub-micron processes, yield is affected by factors such as mask pattern fidelity, optical proximity effects and photoresist processing. Some of the more prevalent concerns include line end pullback, corner rounding and line-width variations. These concerns are largely dependent on local pattern density and topology.

Optical proximity correction (OPC) has been used to improve image fidelity. In general, current OPC techniques involve running a computer simulation that takes an initial data set having information relating the desired pattern and manipulates the data set to arrive at a corrected data set in an attempt to compensate for the above-mentioned concerns. The photomask can then be made in accordance with the corrected data set. Briefly, the OPC process can be governed by a set of geometrical rules (e.g., "rule-based OPC" employing fixed rules for geometric manipulation of the data set), a set of modeling principles (e.g., "model-based OPC" employing predetermined behavior data to drive geometric manipulation of the data set) or a hybrid combination of rule-based OPC and model-based OPC.

The computer simulation can involve iteratively refining the data set using an edge placement error (EPE) value as a benchmark for the compensating process. In some OPC processes, the features and lines of the desired (or target) pattern are broken into edge fragments (or edge segments) and each edge fragment is associated with a simulation point (also referred to as a control point). The fragmented data set is manipulated based on the rules and/or models. For example, the edge fragments can be moved inward or outward. Then, a simulation can be run to determine predicted placement of the edges by simulated "imaging" of the manipulated pattern onto a wafer. The predicted edges are compared against their desired placement; and, for a single point along each edge fragment such as the simulation point, a determination of how far the predicted edge placement deviates from the desired location is derived. If the predicted edge placement corresponds to the desired location, the edge placement error for that edge will be zero. As the predicted edge placement varies from the desired location, a positive or negative value in nanometers (or fractions thereof) can be derived. Determining EPE in this manner provides a one dimensional value for the offset between the desired edge (or segment thereof) and the predicted edge fragment placement.

To date, techniques for determining how the OPC engine fragments any particular feature or line is conducted in an intensively manual process that involves decisions made by a person or persons using engineering judgement. For instance, the OPC engine can be programmed with a static set of rules for setting fragmentation parameters for various features and lines of the data set. The fragmentation parameters can include, for example, the number of fragments, fragmentation length and simulation point placement for various types of features. Unfortunately, this rule based approach is not optimized for the wide variety of features and/or lines that may be present in a desired layout. Therefore, the fragmentation parameters for any particular feature or line may limit how well the data set can be corrected for the above-mentioned concerns.

Current OPC techniques work fairly well when the critical dimension is relatively large (e.g., 0.25 microns and larger). That is, using OPC with edge placement error as the driving factor, the corrected data set can become highly tuned. However, the applicants have found that as IC structures become smaller, correction of the pattern data set using conventionally fragmented data sets can lead to under-corrected and/or over-corrected patterns. As a result, undesired pattern irregularities may occur, such as excessive corner rounding, line end pull back, excessive feature and line width variations (e.g., including narrowing and/or bulging), shorting between structures and so forth.

Accordingly, there exists a need in the art for an improved methodology for fragmenting integrated circuit layout data sets prior to or part of an OPC simulation to correct a desired photolithographic pattern.

SUMMARY OF THE INVENTION

According to one aspect of the invention, the invention is directed to a method for developing an optimized layout fragmentation script for an optical proximity correction (OPC) simulation tool. The OPC simulation tool is for manipulating an integrated circuit layout corresponding to a layer to be embodied in a wafer by a photolithographic technique. The method can include a) providing a test pattern layout having at least one structure representing a portion of the integrated circuit layout; b) iteratively conducting optical proximity correction on the test pattern layout for each desired permutation of at least one fragmentation parameter associated with the test pattern layout and for each permutation outputting a corrected test pattern layout; c) simulating the printing of each corrected test pattern layout; and d) analyzing each simulated printing to select one of the permutations of the at least one fragmentation parameter to apply to the integrated circuit layout prior to correction with the OPC simulation tool.

According to another aspect of the invention, the analyzing of d) can include generating edge placement error (EPE) values with finer resolution than is used to generate EPE values as part of the optical proximity correction of b).

According to another aspect of the invention, the analyzing of d) can includes generating edge placement error (EPE) values with finer resolution than is used to generate EPE values as part of the OPC simulation tool.

According to another aspect of the invention, the invention is directed to a program embodied in computer readable medium to develop an optimized layout fragmentation script for an optical proximity correction (OPC) simulation tool. The OPC simulation tool is for manipulating an integrated circuit layout corresponding to a layer to be embodied in a wafer by a photolithographic technique. The program can include a) code that iteratively conducts optical proximity correction on a test pattern layout for each desired permutation of at least one fragmentation parameter associated with the test pattern layout and for each permutation outputs a corrected test pattern layout, wherein the test pattern layout has at least one structure representing a portion of the integrated circuit layout; b) code that simulates printing of each corrected test pattern layout; and c) code that analyzes each simulated printing to select one of the permutations of the at least one fragmentation parameter to apply to the integrated circuit layout prior to correction with the OPC simulation tool.

BRIEF DESCRIPTION OF DRAWINGS

These and further features of the present invention will be apparent with reference to the following description and drawings, wherein.

DISCLOSURE OF INVENTION

In the detailed description that follows, corresponding components have been given the same reference numerals, regardless of whether they are shown in different embodiments of the present invention. To illustrate the present invention in a clear and concise manner, the drawings may not necessarily be to scale and certain features may be shown in somewhat schematic form.

The present invention includes a method of developing an optimized fragmentation script for use by an optical proximity correction (OPC) simulation tool. The OPC simulation tool can use rule-based and/or model-based correction techniques to modify a desired integrated circuit (IC) pattern for layout on a photomask (or reticle) to be used in photolithographic processing of a wafer. OPC adjustments to the pattern are made by fragmenting edges of the desired pattern and manipulating those fragments to account for a variety of process characteristics, such as reticle fidelity, optical proximity effects and photoresist processing. Accordingly, the ability to optimize a fragmentation script for a particular desired pattern can improve the results achieved by the OPC process.

As will become more apparent below, a fragmentation script development tool is used to systematically generate a corrected test pattern layout using an iterative OPC routine for each desired permutation of at least one fragmentation variable associated with a test pattern layout. These corrected test pattern layouts can be analyzed to selected one of the permutations of fragmentation variables to apply to the IC pattern layout before OPC of the IC pattern layout. As a result, the fragmentation script development tool uses the power of model-based OPC and simulation itself to systematically optimize a fragmentation script.

The present invention will be described in the exemplary context of the preparation process for ultimate patterning a layer of material (e.g., a polysilicon gate or word line layer, a dielectric layer, a source/drain layer, a metal interconnect layer, a contact layer, etc.) that forms a part of an integrated circuit. Example integrated circuits include general use processors made from thousands or millions of transistors, a flash memory array or any other dedicated circuitry. However, one skilled in the art will appreciate that the methods, software tools and devices described herein can also be applied to the process of manufacturing any article made using photolithography, such as micromachines, disk drive heads, gene chips, micro electromechanical systems (MEMS) and so forth.

Figure 1:
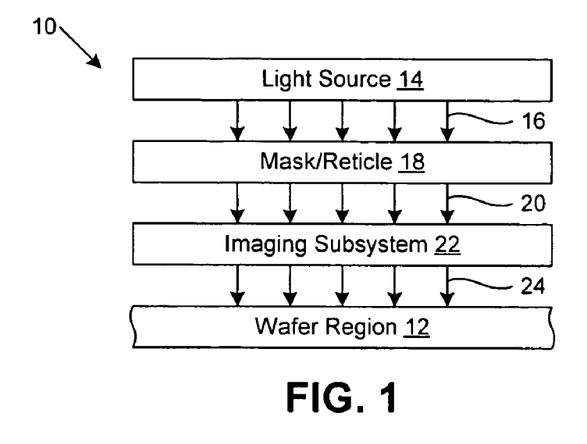
FIG. 1 is a schematic block diagram of a exemplary integrated circuit processing arrangement.

Referring to FIG. 1, illustrated is a schematic block diagram of an exemplary integrated circuit processing arrangement that includes a lithography system 10 used to image a pattern onto a wafer 12, or a region thereof. The system 10 can be, for example, a step-and-repeat exposure system or a step-and-scan exposure system, but is not limited to these example systems. The system 10 can include a radiation (e.g., light) source 14 for directing energy 16 towards a photomask 18. The energy 16 can have, for example, a deep ultraviolet wavelength (e.g., about 248 nm or about 193 nm), or a vacuum ultraviolet (VUV) wavelength (e.g., about 157 nm), although other wavelengths, including extreme ultraviolet wavelengths, are possible.

The mask 18 selectively blocks (or, in some instances, selectively reflects or phase shifts) light energy 16 such that a light energy pattern 20 defined by the mask 18 is transferred towards the wafer 12. An imaging subsystem 22, such as a stepper assembly or a scanner assembly, sequentially directs the energy pattern 20 transmitted by the mask 18 to a series of desired locations on the wafer 12. The imaging subsystem 22 may include a series of lenses and/or reflectors for use in scaling and directing the energy pattern 20 towards the wafer 12 in the form of an imaging (or exposure) energy pattern 24.

Figure 2:
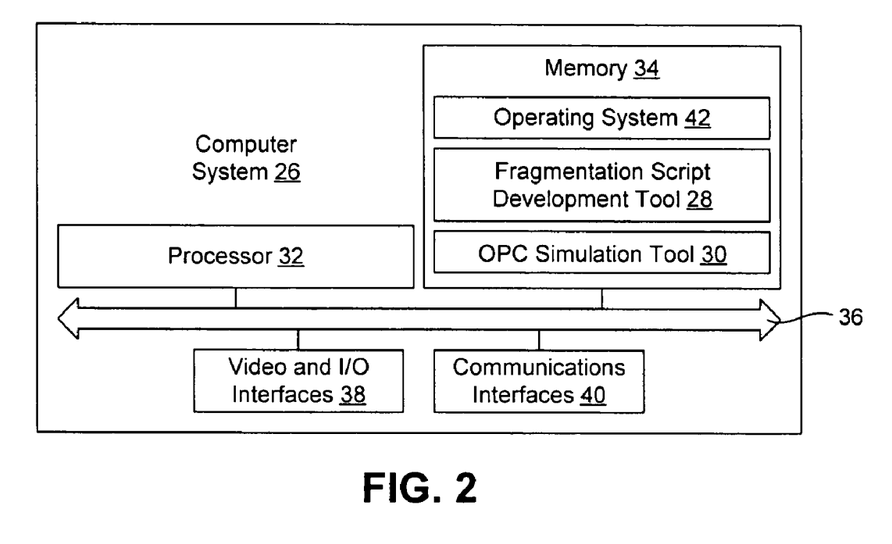
FIG. 2 is a schematic block diagram of a computer system capable of executing a fragmentation script development tool in accordance with the present invention.

Turning now to FIG. 2, a schematic block diagram of a computer system 26 capable of executing a fragmentation script development tool 28 in accordance with the present invention is illustrated. The fragmentation script development tool 28 can generate a fragmentation script for a desired integrated circuit layer layout, or portion thereof. The fragmentation script can be used by an OPC simulation tool 30 to break edges of the desired layout into multiple segments that can be manipulated during the OPC process. Accordingly, the computer system 26 also can execute the OPC simulation tool 30. Alternatively, fragmentation script generation and OPC can be carried out by different computer systems that are optionally networked together. In one embodiment, the fragmentation script development tool 28 and/or the OPC simulation tool 30 are embodied as one or more computer programs (e.g., one or more software applications including compilations of executable code). The computer program(s) can be embodied on a computer readable medium, such as a magnetic or optical storage device (e.g., hard disk, CD-ROM, DVD-ROM, etc.).

To execute the fragmentation tool 28 and/or the OPC simulation tool 30, the computer system 26 can include one or more processors 32 used to execute instructions that carry out a specified logic routine. In addition, the computer system 26 can have a memory 34 for storing data, software, logic routine instructions, computer programs, files, operating system instructions, and the like. The memory 34 can comprise several devices and includes, for example, volatile and non-volatile memory components. As used herein, the memory 34 can include, for example, random access memory (RAM), read-only memory (ROM), hard disks, floppy disks, compact disks (e.g., CD-ROM, DVD-ROM, CD-RW, etc.), tapes, and/or other memory components, plus associated drives and players for these memory types. The processor 32 and the memory 34 are coupled using a local interface 36. The local interface 36 can be, for example, a data bus with accompanying control bus, a network, or other subsystem.

The computer system 26 can have various video and input/output interfaces 38 as well as one or more communications interfaces 40. The interfaces 38 can be used to coupled the computer system 26 to various peripherals and networked devices, such as a display (e.g., a CRT display or LCD display), a keyboard, a mouse, a microphone, a camera, a scanner, a printer, a speaker and so forth. The interfaces 40 can be comprised of, for example, a modem and/or network interface card, and can enable the computer system 26 to send and receive data signals, voice signals, video signals, and the like via an external network, such as the Internet, a wide area network (WAN), a local area network (LAN), direct data link, or similar wired or wireless system.

The memory 34 stores an operating system 42 that is executed by the processor 32 to control the allocation and usage of resources in the computer system 26. Specifically, the operating system 42 controls the allocation and usage of the memory 34, the processing time of the processor 32 dedicated to various applications being executed by the processor 32, and the peripheral devices, as well as performing other functionality. In this manner, the operating system 42 serves as the foundation on which applications, such as the fragmentation script development tool 28 and/or the OPC simulation tool 30, depend as is generally known by those with ordinary skill in the art.

Figure 3:
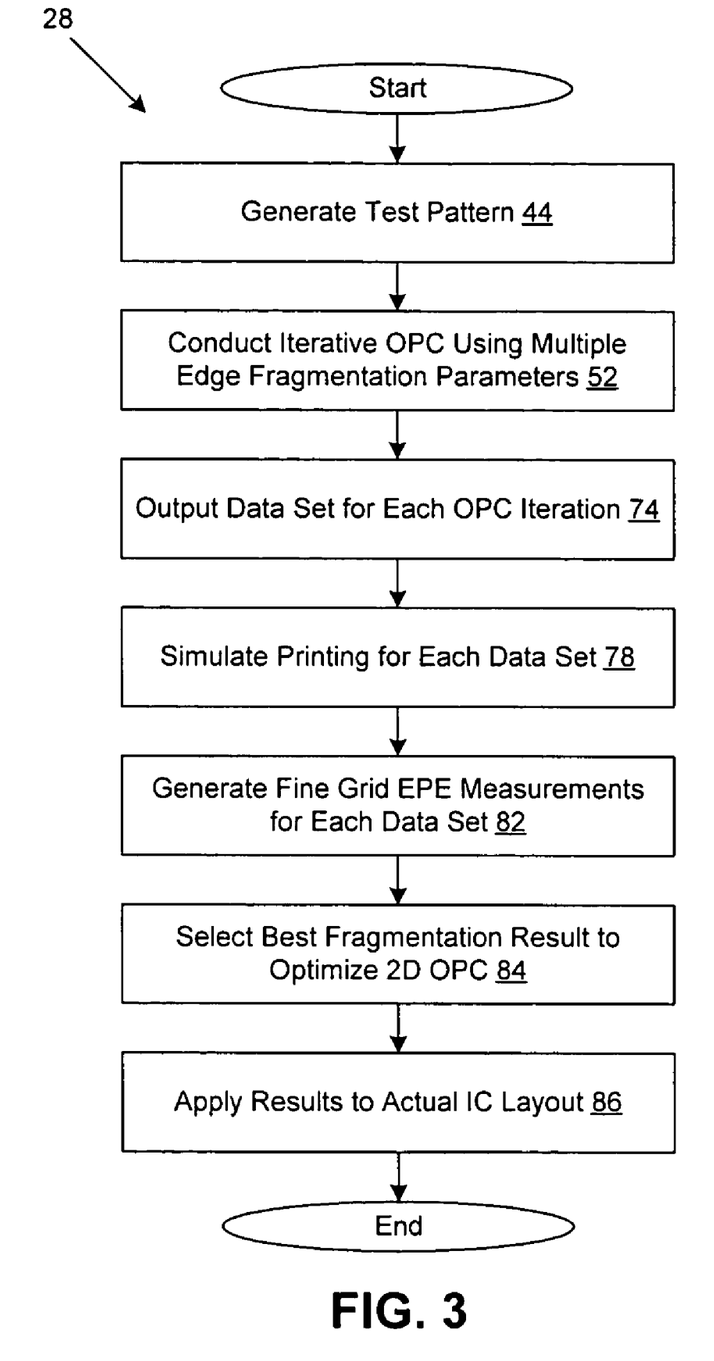
FIG. 3 is a flow chart of an example embodiment of the fragmentation script development tool.

With additional reference to FIG. 3, shown is a flow chart of an example embodiment of the fragmentation script development tool 28. The flow chart of FIG. 3 can be thought of as depicting steps of a method implemented in the computer system 26.

Figures 5, 6, 7, 8, 9, 10, 11:
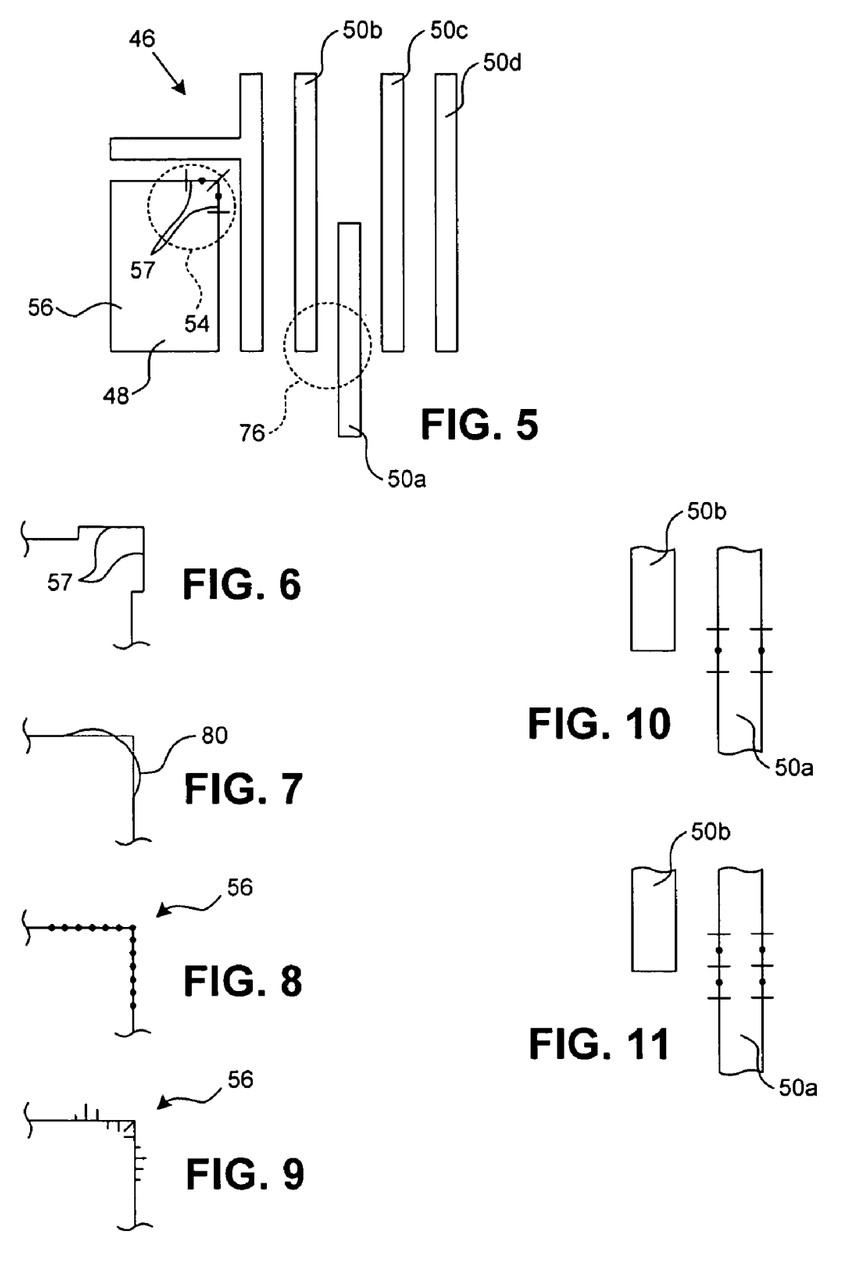
FIG. 5 is a simplified example of a test pattern layout representing certain features of an integrated circuit layer.
FIG. 6 is an enlarged example fragmentation manipulation for a first portion of the test pattern layout.
FIG. 7 is an enlarged simulated printing of the first portion of the test pattern layout.
FIG. 8 is an example fine grid simulation point layout for the first portion of the test pattern layout.
FIG. 9 is an example geometrical edge placement error map of the first portion of the test pattern layout.
FIG. 10 is a first example fragmentation for a second portion of the test pattern layout.
FIG. 11 is a second example fragmentation for the second portion of the test pattern layout.

The method, as specified by the fragmentation script development tool 28, can begin in block 44 where a test pattern is generated. With additional reference to FIG. 5, shown is a simplified example of a test pattern layout 46 that represents certain features that may be found in a desired IC pattern layout that will undergo correction with the OPC simulation tool 30. As should be recognized, the shown test pattern layout 46 is exemplary and can change dramatically based on a number of factors, primarily being the characteristics of the desired IC pattern layout. The illustrated test pattern layout 46 includes features 48 and lines 50 (referred to collectively as structures). The test patterns contemplated herein can include a relatively small number of structures (e.g., less than ten structures as shown) or a relatively large number of structures (e.g., hundreds or thousands of structures).

The test pattern layout 46 can be generated using information related to the desired IC pattern layout and/or known process characteristics. Information relating the desired IC pattern layout can include, for example, the design rules that dictate the implementation of the desired IC pattern layout. The application of the design rules for the desired IC pattern layout to the generation of the test pattern layout 46 can assist in generating a test pattern with structures and groups of structures that have commonality with the structures and groups of structures of the desired IC pattern layout.

Other information that can be used during test pattern generation can include the design style used by designers to arrange the desired IC pattern layout. The design style includes knowledge regarding the techniques used by the designers of the desired IC pattern layout, including subtle choices made during the design process. The design style can provide insight into the arrangement of structures on the wafer. This knowledge and insight can help generate the test pattern layout 46 with structures and groups of structures that have commonality with the structures and groups of structures of the desired IC pattern layout.

Other information that contributes to the generation of the test pattern can be derived from the desired IC pattern layout itself. For example, critical features of the desired IC pattern layout can be identified and included in the test pattern layout 46. As another example, the desired IC pattern layout can be parsed to identify repeating structures and/or repeating groups of structures, and those repeating attributes can be included in the test pattern layout 46.

Upon establishment of the test pattern layout 46, the fragmentation script development tool 28 can proceed to block 52. In block 52, the fragmentation script development tool 28 can iteratively carry out an OPC routine on the test pattern for each of a plurality of edge fragmentation configurations. As is known in the art, the layout processed by OPC routines are typically place in a technology file (or "tech" file) containing a representation of the layout. For example, tech files are often populated with polygons in a particular file format, such as GDSII.

As will become apparent from the discussion below, the OPC routine can be run iteratively on the test pattern; and, for each iteration, the test pattern can be fragmented in a different manner. Variations to the fragmentation for each iteration can include changing one or more "fragmentation parameters," including, for example, number of fragments, fragmentation length, simulation point (also referred to as control point) location, inter-feature fragmentation variables such as fragmentation offset with respect to an adjacent structure, allowable fragmentation movement (e.g., how far the OPC tool is allowed to move the fragment "in" or "out"), etc.

The iterations of the OPC routine can also include introducing variations to parameters associated with a selected structure(s) and/or nearby structures ("structure parameters"), such as feature width and/or length, space to an adjacent structure, width or size of an adjacent structure and so forth. The iterations of the OPC routine can also include introducing variations to "process parameters," such as illumination type, illumination dose, focus, resist characteristics, reticle characteristics and so forth.

In one embodiment, the tech file containing the test pattern can be passed to the iterative OPC routine 52 in a pre-parameterized format. In this embodiment, the tech file can contain every parameter permutation desired to run through OPC. In another embodiment, and a described below, the iterative OPC routine 52 can be run in conjunction with scripts to parameterize the test pattern layout 46 as the iterative OPC routine 52 is executed. These scripts can take the form of software wrappers that vary parameters associated with the test pattern layout 46 and that are executed in conjunction with an otherwise static OPC script.

With continued reference to the test pattern layout 46 of FIG. 5, circle 54 highlights a corner region of a rectangular feature 56. FIGS. 6 through 9 show an enlarged representation of the corner region highlighted by circle 54 in various stages of processing by the fragmentation script development tool 28. The corner can be fragmented in a number of ways. In the illustrated example, the corner has two fragments 57, demarked in FIG. 5 by intersecting lines at the ends of each fragment 57. The illustrated fragments 57 start at the corner of the rectangular feature 56 and extend along the respective sides of the rectangular feature 56. As indicated, the length of each fragment 57 is variable and need not start at the corner of the rectangular feature 56. Each fragment 57 is associated with a simulation point. In the illustrated example, the simulation points are represented by dots. The illustrated simulation points are shown in the center of each fragment 57, but can be located at any point along the fragment 57.

Figure 4:
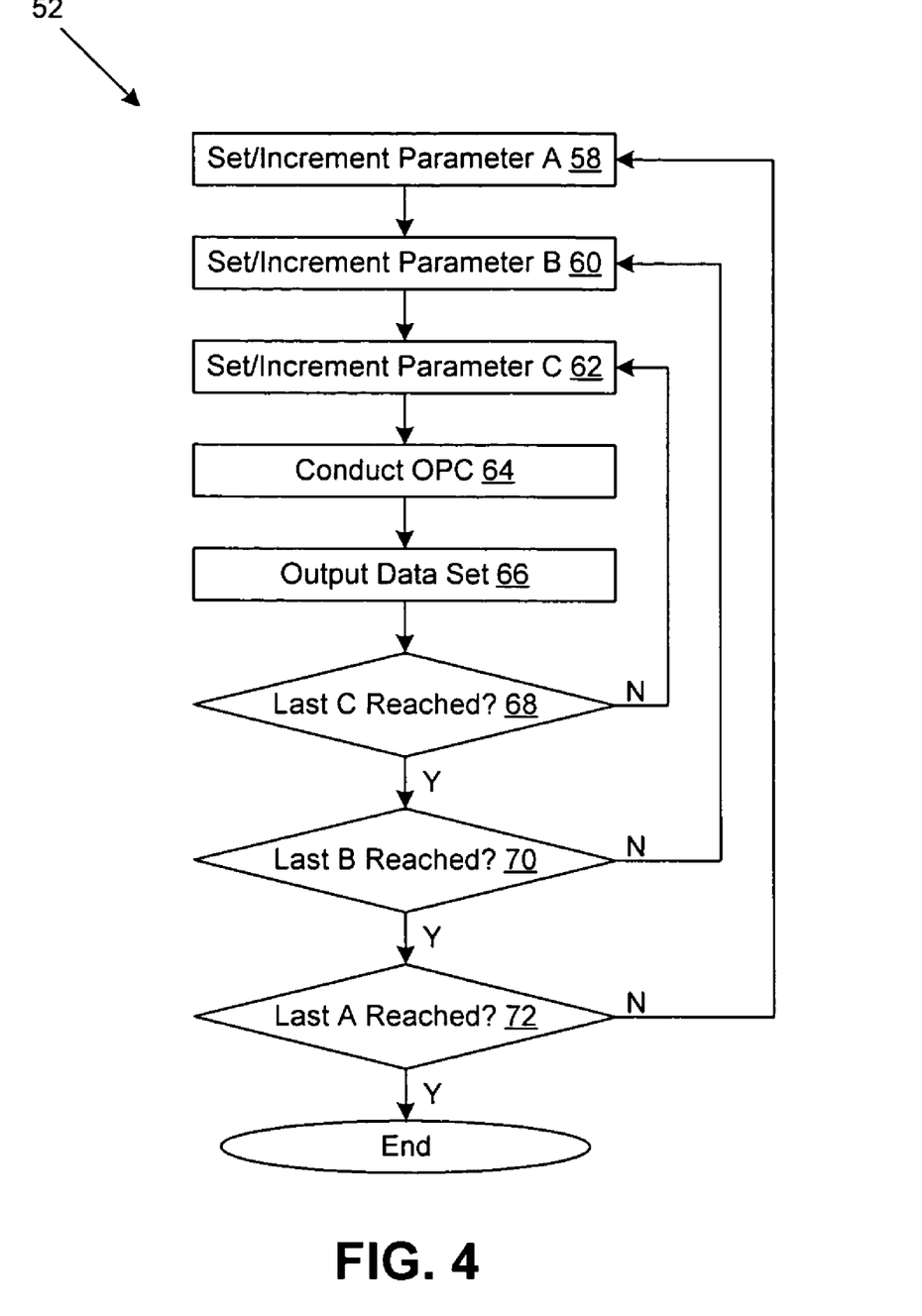
FIG. 4 is a flow chart of an example iterative optical proximity correction (OPC) routine portion of the fragmentation script development tool.

With additional reference to FIG. 4, shown is an example approach to the iterative OPC routine of block 52. The iterative OPC routine 52 can be implemented to conduct OPC on the test pattern layout 46 or a selected section of the test pattern layout 46 for all desired permutations of the values for the fragmentation parameters, structure parameters and/or process parameters associated with the test pattern layout 46. To assist in automating this function, software loops can be employed to successively increment one or more variables and conduct OPC on each combination of variables until each variable combination has been simulated. The illustrated iterative OPC routine 52 shows loops used to vary three parameters, named parameter A, parameter B and parameter C. In some situations, a particular parameter may relate to more than one variable, such as fragmentation length for multiple fragments. For these situations, loops may be run within the main loop for a certain parameter to address all desired variations relating to each combination of variables for the parameter.

The illustrated iterative OPC routine 52 shows varying generically named parameters. It should be understood that the parameters A, B and C can be selected from any of the fragmentation parameters described above, the structure parameters discussed above, the process parameters discussed above, or any other variable that can be simulated using OPC. Although three parameters are shown, the iterative OPC routine 52 can be modified to vary fewer than three parameters or more than three parameters. As a result, the illustration of three parameters in the flow diagram of FIG. 4 is merely for example purposes only. Also, FIG. 4 infers varying one parameter at a time, but the iterative OPC routine 52 can be modified to vary more than one parameter prior to running OPC on the parameterized test pattern layout 46.

The iterative OPC routine 52 can begin in block 58 where a first parameter (parameter A) is set to a first value. As an example, the first parameter can be fragmentation length for each fragment of a particular structure or portion of a structure. Following the example of FIGS. 5 through 9, the relative lengths of each fragment for the corner region highlighted by circle 54 can be established in block 58. Each fragment can be assigned a length independent of the other fragment(s). For instance, each fragment can have a length of about 20 nanometers (nm) to about 100 nm. As will become more apparent, the iterative OPC routine 52 can vary the lengths of each fragment and run OPC on the parameterized test pattern layout 46, such as by independently adjusting (or incrementing) the fragment lengths by a desired amount, such as by 1.0 nm increments or by 2.0 nm increments.

Next, in block 60, the iterative OPC routine 52 can set a second parameter (parameter B) to a first value. As an example, the second parameter can be simulation point location, such as at a first end of the fragment, at the center of a fragment, at a second end of the fragment or any other location associated with the fragment.

In block 62, the iterative OPC routine 52 can set a third parameter (parameter C) to a first value. As an example, the third parameter can be a maximum allowable fragmentation movement value, such as a distance value that the OPC tool is not permitted to exceed when correcting the fragment.

As indicated, only three parameters are shown by example in FIG. 4; however, any number of fragmentation, structure or process parameters can be set during the iterative OPC routine 52.

Once the parameter values are set in blocks 58 to 62, the OPC routine 52 can proceed to block 64 where the iterative OPC routine 52 carries out OPC on the test pattern layout 46 using the set parameters. In one embodiment, the OPC simulation tool 30 can be used to carry out the OPC of block 64. The OPC of block 64 can include acting on a topographical data set of the test pattern layout 46 to generate a corrected data set that represents a reticle layout that could be used to image a wafer using a photolithographic process. OPC techniques that follow the rule-based and/or model-based approaches described above are known in the art and will not be explained in great detail herein. Generally, OPC involves iteratively making changes to the location of fragments contained within the test pattern layout 46. As an example, FIG. 6 shows fragments 57 of the corner region of rectangular feature 56 moved outward from the rectangular feature 56 as a result of the OPC process.

When a simulation of the printing of the test pattern converges upon the desired layout with acceptable limits, the OPC routine can end. In common OPC routines, convergence is determined by monitoring edge placement error (EPE). EPE is measured by comparing the location of the simulated printed edge (e.g., predicted edge placement as determined by the OPC simulation tool 30) versus the location of the simulation point for each fragment of the original layout. As indicated, determining EPE in this manner provides a one dimensional value for the offset between a particular edge fragment and the predicted location of the printed edge.

Following the OPC of block 64, the OPC simulation tool 24 can, in block 66, output a data set for the present iteration of the iterative OPC routine 52. The data set can include the original layout information passed to the OPC simulation tool, which includes the parameters set in blocks 58–62, paired with the corrected layout information derived from the OPC of block 64.

Thereafter, the iterative OPC routine 52 can, in block 68, determine if each desired third parameter (parameter C) has been run through OPC with the current values of the first parameter (parameter A) as set in block 58 and the second parameter (parameter B) as set is block 60. If the last of the third parameters values has not been reached, the iterative OPC routine 52 can loop back to block 62 where the third parameter is incremented and then OPC on the test pattern layout 46 can be carried out in block 64.

If, in block 68, the last of the third parameter values has been reached, the iterative OPC routine 52 can proceed to block 70 where the iterative OPC routine 52 can determine if each desired second parameter (parameter B) has been run through OPC with the current value of the first parameter (parameter A) as set in block 58 and each value of the third parameter (parameter C) as looped by blocks 62 and 68. If the last of the second parameters values has not been reached, the iterative OPC routine 52 can loop back to block 60 where the second parameter is incremented and then OPC on the test pattern layout 46 can be iteratively carried out in block 64 while looping through the values for the third parameter using blocks 62 and 68.

If, in block 70, the last of the second parameter values has been reached, the iterative OPC routine 52 can proceed to block 72 where the iterative OPC routine 52 can determine if each desired first parameter (parameter A) has been run through OPC with each value of the second parameter as looped by blocks 60 and 70 and with each value of the third parameter (parameter C) as looped by blocks 62 and 68. If the last of the first parameters values has not been reached, the iterative OPC routine 52 can loop back to block 58 where the first parameter is incremented and then OPC on the test pattern layout 46 can be iteratively carried out in block 64 while looping through the values for the third parameter using blocks 62 and 68 and the second parameter using blocks 60 and 70. Otherwise, the iterative OPC routine 52 can end and the fragmentation script development tool 28 can proceed to block 74.

With additional reference to FIGS. 10 and 11, shown are enlarged regions of the test pattern layout 46 highlighted by circle 76. This region is illustrated and described to serve as another example of how the fragmentation script development tool 28 can generate fragmentation rules for a particular area of a test pattern layout 46. Within circle 76, the test pattern layout 46 has a line 50a that is located partially in a dense layout area adjacent lines 50b, 50c and 50d and is located partially in an isolated layout area. As indicated, these types of dense to isolated transitional areas, if uncorrected by OPC, can be susceptible to line width variations and other proximity effects. Therefore, such regions could benefit from being fragmented in an appropriate manner prior to OPC to optimize the correcting ability of the OPC process.

Accordingly, the region highlighted by circle 76 can be iteratively corrected by an OPC process using a variety of fragmentation parameters, structure parameters and/or process parameters. For example, the iterative OPC routine 52 can be applied to region 76 of the test pattern layout 52. An example parameter for the iterative OPC routine 52 can include the number of fragments, such as one fragment per line 50a edge in the dense to isolated region as shown in FIG. 10 or two fragments per line 50a edge in the dense to isolated region as shown in FIG. 11. Another example parameter for the iterative OPC routine 52 can include fragment offset from the end of an adjacent structure (e.g., line 50b) as measured from an end of the fragment. Yet another example parameter for the iterative OPC routine 52 can include fragment length. As should be appreciated, the forgoing parameters are examples and any number of other parameters can be used during the iterative OPC routine 52, including, but not limited to fragmentation features of the line ends (e.g., ends of lines 50b and 50c) adjacent to the line or feature having a transition from a dense layout area to an isolated layout area (e.g., line 50a).

With continued reference to FIG. 3, in block 74, the fragmentation script development tool 28 can output a family of data sets for the test pattern layout 46 as a whole or for each area of the test pattern layout 46 that has particular interest, such as the corner highlighted by circle 54, the transition highlighted by circle 76, and/or any other area of the test pattern layout 46. Each family of data sets can contain a data set grouping for each iteration of the iterative OPC routine 52. Each data set grouping can include the information pairings generated by the OPC simulation tool 30 in block 66 of the iterative OPC routine 52. For example, for each data set grouping, a table or other database structure can be populated to contain the original layout information passed to the OPC simulation tool, which includes desired edge placement data for the corresponding area of the test pattern layout 46; the parameters set in blocks 58–62; and the corrected layout information derived from the OPC of block 64.

Using the information from each data set grouping, the fragmentation script development tool 28, in block 78, can simulate printing of all the various parameterized and corrected layouts of the test pattern layout 76, or portions thereof. The simulated printing of block 78 for each data set grouping is carried out to generate corresponding predicted printed topologies that can be evaluated to determine which set of fragmentation, structure and process parameters resulted in an optimized simulated printing of the test pattern layout 76 or particular portion of the test pattern layout 76. As a graphical example of a simulated printing, an enlarged example simulated printing of the corner region 54 for a selected one of the data set groupings is shown in FIG. 7. In particular, a printed simulation 80 of the corner region is shown superimposed upon the desired edge from the test pattern layout 46.

In one embodiment, no actual printing simulation is executed in block 78. Rather, the last simulated printing of the OPC process carried out by the iterative OPC routine 52 in block 64 can be stored as part of the data set groupings and used as the simulated printing for block 78.

In another embodiment, a printing simulation is executed in block 78. For example, given the data from each data set grouping, a printing simulation tool can be executed to predict where the corrected edges of the test pattern layout 46, if they were implemented on a reticle, would be imaged on a virtual wafer. The simulated printing can optionally include varying process variables (e.g., resist features, illumination options, etc.) to determine what effects such variations may have on the image fidelity. The simulation of block 78 can be implemented to generate high resolution predicted edge placement information that can be used in conjunction with a fine grid edge placement error evaluation as described below.

Once each data set grouping has a corresponding simulated printed layout, the fragmentation script development tool 28 can continue in block 82. In block 82, the fragmentation script development tool 28 can carry out an evaluation of each simulated printed layout.

In one embodiment, the evaluation is conducted by making fine grid edge placement error (EPE) measurements of the simulated printed layout 80 versus the test pattern layout 46. With additional reference to FIG. 8, the original test pattern layout 46 edges can be associated with a plurality of simulation points, each represented by a dot. For each simulation point, an EPE value is generated by measuring the distance between the simulation point and the simulated printed edge 80. The EPE value can be expressed in, for example, nanometers or fractions thereof. If the simulated printed edge coincides with the original edge from the test pattern layout 46 at a particular simulation point, the corresponding EPE value will be zero. If the simulated printed edge is outside the area of the structure defined by the test pattern layout 46 edge, the EPE value can have a positive value. Similarly, if the simulated printed edge is inside the area of the structure defined by the test pattern layout 46, the EPE value can have a negative value.

The simulation points used to derive the EPE values in block 82 can be arranged on a "fine grid." That is, the simulation points can be placed relatively close together and/or at uniform intervals. In one embodiment, conventional simulation software can be used to make the fine grid EPE measurements by adding simulation points to existing fragments or adding fragments, each with one or more simulation points.

In one embodiment, the simulation points for the evaluation of block 82 can be evenly spaced at about 1.0 nm intervals. On other embodiments, the simulation points can be spaced apart by about 0.25 nm, by about 0.33 nm, by about 0.5 nm, by about 0.75 nm, by about 1.5 nm or about 2.0 nm. Although specific examples of spacing has been identified for the simulation points, it should be understood that the spacing need not be limited to the examples recited herein and other spacing, whether at regular intervals or irregular intervals, is intended to fall within the scope of the invention.

Using the EPE values generated in block 82, a two dimensional representation of the simulated printed edge can be established with a relatively small data set (e.g., the data being the EPE values). This two dimensional representation of EPE values is indicative of the relationship of the contour of the simulated edge placement versus the desired test pattern layout. With additional reference to FIG. 9, shown is an example graphical representation of the EPE values for a selected data set grouping for the corner 54. As illustrated by the example of FIG. 9, the EPE values are shown using hashmarks extending from the original test pattern layout 46. It should be understood that such a graphical representation need not be drawn by the fragmentation script development tool 28. Rather, the fragmentation script development tool 28 can store and/or process the fine grid EPE values directly.

Once the evaluation of each data set grouping has been completed in block 82, the fragmentation script development tool 28 can proceed to block 84 where the evaluation results (e.g., the relationship of the contour of the simulated edge placement versus the test pattern layout as indicated by the fine grid EPE values) are analyzed for quality of output. In this regard, the fine grid EPE measurements can be used to track the configuration of the simulated printed layout such as inward or outward bulging, widest point, critical minimum distance to another edge, etc. In one embodiment, the evaluation results are analyzed to determine which of simulated printed layouts falls with predetermined specification ("spec") limits for the test pattern layout. If multiple simulated printed layout fall with the predetermined spec limits, further analysis can be conducted to determine the data set grouping that would best arrive at printing the desired pattern. The data set grouping predicted to produce the best results can be automatically flagged by the fragmentation script development tool 28 and/or reported to a user. This analysis can be repeated for each geometry of interest from the test pattern layout, including, for example, critical dimension features, highly repeated features (such as gates), corners, line ends, areas of high inter-feature proximity, transitions from dense to isolated regions, and so forth.

Various mathematical and/or analytical approaches can be used for determining the data set grouping that falls best within spec limits, or "best result." One factor to consider during the analysis of block 84 can be to analyze geometrical correspondence between simulated edge placement and test pattern layout 46. For example, the fragmentation script development tool 28 can determine the data set grouping that produces the highest percentage of test sites (e.g., fine grid EPE measurements) that fall within spec limits. In this example, the output could take the form of a report of the percentage of in-spec sites as a function of fragmentation length for a particular class of structures, such as a minimum line width gate features.

Other techniques could include filtering to eliminate any data set with a fine grid EPE value above a certain threshold (e.g., for positive EPE values) and/or below a certain threshold (e.g., for negative EPE values). As another example, averaging of the fine grid values can be made and the lowest average can be selected. As another example, the EPE values can be aggregated and the lowest total sum can be selected. As another example, a statistical analysis or other type of critical analysis can be performed to assess the "best result." As another example, electrical modeling of the simulated printed structures can be made to determine which of the data set grouping produced a structure closest to the electrical characteristics of the desired structure. Although a few approaches to determine which data set grouping would generate the "best" printed structure(s), it should be understood that other approaches exist and the scope of the invention described herein is intended to include those approaches.

The fragmentation parameters, structure parameters and/or process parameters used during the iterative OPC routine 52 that are associated with the identified one of the simulated printed layouts that most closely approximates the desired edge placement (e.g., falls best within spec) can be readily determined by the fragmentation script development tool 28 from the data set groupings. One can draw the conclusion that parameters from the identified data set groupings can be used to repeatedly image satisfactory images corresponding to the test pattern layout, or portion thereof, on a wafer. It logically follows that when an actual IC layout to be fabricated on a wafer contains structures that are the same or similar to structures from test pattern layout 46, the data set groupings can be parsed to determine a particular set of parameters that can aide in the correction of the actual IC layout. Therefore, the fragmentation script development tool 28 can be considered a means to determine geometrical rules for fragmenting an actual IC layout to achieve greater conformity to specification ("spec") limits associated with the actual IC layout.

For example, in block 86, the results of the foregoing process implemented with the fragmentation script development tool 28 can be applied to select fragmentation parameters and/or other parameters associated with preparing an actual IC layout for OPC. In one embodiment, the actual IC layout can be compared against the test pattern layout 46. Where commonalities and/or similarities exist between the actual IC layout and the test pattern layout 46 exist, the fragmentation parameters that lead to the best simulated printing of the test pattern layout 46 can be used when fragmenting the actual IC layout 46 in preparation for OPC of the actual IC layout. In this manner, the fragmentation of the actual IC layout 46 can be governed by model results derived from the test pattern layout 46 rather than by static fragmentation rules.

Without intending to be bound by theory, it is believed that the fragmentation method described herein can result in improved OPC of actual IC layouts relative to the results accomplished by conventional techniques due to a comprehensive and rigorous approach to fragmentation. For example, areas of the actual IC layouts that are susceptible to various optical proximity effects (e.g., critical dimension locations, structures that have a small spacing to an adjacent structure, structure corners, transitions from dense topology to isolated topology, etc.) can have customized fragmentation based on the modeling derived from the fragmentation script development tool 28 that ultimately imparts an improved correction through OPC. Therefore, the fragmenting approach may differ from structure to structure within the actual IC layout. The fragmenting approach may differ on an intra-structure basis as well. As an example, a corner of a rectangle closely adjacent a line may be fragmented in a first manner and an opposite corner may be fragmented in a second manner. The first and the second fragmenting manners may each be established by the modeling derived from the fragmentation script development tool 28, or one may be established by predetermined static fragmentation rules and the other by the modeling derived from the fragmentation script development tool 28.

As should be appreciated, the fragmentation script development tool 28 operates on a relatively small test pattern layout that has a correspondingly compact tech file associated therewith. Although the test pattern can contain a range of critical features that may be found in an actual IC layout, the test pattern layout is of a size that parameterized OPC can be run on the test pattern in a reasonable period of time. Also, simulating printing of each permutation of variables associated with test pattern layout and generating multi-point, fine grid EPEs can also be performed in a reasonable period of time. Therefore, the fragmentation script development tool 28 takes advantage of a relative small layout that can provide a modeling tool to derive accurate fragmentation approaches for use with an actual IC layout. If such parameterizing and/or fine grid measurements (e.g., versus sparse grid EPE calculations used to generate one dimensional edge offset values) were conducted during full OPC of an actual IC layout, the computation requirements would be exceedingly high and the OPC routine would not be efficiently executed. Therefore, using the techniques described herein it is computationally possible to evaluate multiple permutations of fragmentation variables to model the behavior of an actual IC layout undergoing OPC.

According to certain embodiments of the invention described herein, the invention can involve automatically executing scripts to vary multiple fragmentation options, structural options and/or process options for a particular test pattern layout. For example, hundreds or thousands of parameter permutations per geometrical structure can be investigated. Resulting corrected patterns for each set of options can be simulated and adherence to specification parameters can be evaluated. Automatic reports of "best results" can be generated so that guidelines for fragmenting specific layout sections can be determined and/or the resulting information for each combination of parameters can be recorded in a file or database for future use, such as part of a lookup table to find the smallest EPE values for given criteria.

Although embodiments of a method of developing a fragmentation script have been described and illustrated herein as following a specific order of steps, one skilled in the art will appreciate that variations to the method exist and these variations are intended to fall within the scope of the invention as defined by the claims appended hereto. For example, certain illustrated blocks and/or steps can be omitted. In addition, other blocks and/or steps can be added. The order of execution of various blocks and/or steps can be carried out in an order other than the order shown or described. Also, certain blocks and/or steps can be carried out concurrently or with partial concurrence. For example, once a data set grouping for a parameterized test pattern layout has been generated through OPC, the simulation, evaluation and analysis of that data set grouping can be conducted before or during OPC of another parameterized test pattern layout.

Although particular embodiments of the invention have been described in detail, it is understood that the invention is not limited correspondingly in scope, but includes all changes, modifications and equivalents coming within the spirit and terms of the claims appended hereto.

What is claimed is:

1. A method of developing an optimized layout fragmentation script for an optical proximity correction (OPC) simulation tool, the OPC simulation tool for manipulating an integrated circuit layout corresponding to a layer to be embodied in a wafer by a photolithographic technique, the method comprising:
    a) providing a test pattern layout having at least one structure representing a portion of the integrated circuit layout;
    b) iteratively conducting optical proximity correction on the test pattern layout for each desired permutation of at least one fragmentation parameter associated with the test pattern layout and for each permutation outputting a corrected test pattern layout;
    c) simulating the printing of each corrected test pattern layout; and
    d) analyzing each simulated printing to select one of the permutations of the at least one fragmentation parameter to apply to the integrated circuit layout prior to correction with the OPC simulation tool.

2. The method according to claim 1, wherein the optical proximity correction of b) is conducted with scripts of the OPC simulation tool.

3. The method according to claim 1, wherein the analyzing of d) includes generating edge placement error (EPE) values with finer resolution than is used to generate EPE values as part of the optical proximity correction of b).

4. The method according to claim 3, wherein the fine resolution EPE values generated for the analysis of d) are indicative of a two dimensional relationship of the contour of simulated edge placement versus the original test pattern layout.

5. The method according to claim 1, wherein the analyzing of d) includes generating edge placement error (EPE) values with finer resolution than is used to generate EPE values as part of the OPC simulation tool.

6. The method according to claim 5, wherein the fine resolution EPE values generated for the analysis of d) are indicative of a two dimensional relationship of the contour of simulated edge placement versus the original test pattern layout.

7. The method according to claim 1, wherein the test pattern layout is developed using factors selected from the group of design rules for the integrated circuit layout, design style for the integrated circuit layout, critical features of the integrated circuit layout, repeating structures of the integrated circuit layout, and combinations thereof.

8. The method according to claim 1, wherein the at least one fragmentation parameter is selected from the group of number of fragments, fragmentation length, simulation point location, fragmentation offset, allowable fragment movement, and combinations thereof.

9. The method according to claim 1, wherein the permutations of the iterative optical proximity correction of b) further include at least one of a structure parameter relating to the test pattern layout and a process parameter relating to the photolithographic technique.

10. The method according to claim 1, wherein the analyzing includes comparing the simulated printing against specifications for the at least one structure of the test pattern layout.

11. The method according to claim 1, further comprising storing each corrected test pattern layout and respective analysis results from the analysis of d) in a database.

12. A program embodied in computer readable medium to develop an optimized layout fragmentation script for an optical proximity correction (OPC) simulation tool, the OPC simulation tool for manipulating an integrated circuit layout corresponding to a layer to be embodied in a wafer by a photolithographic technique, the program comprising:
  a) code that iteratively conducts optical proximity correction on a test pattern layout for each desired permutation of at least one fragmentation parameter associated with the test pattern layout and for each permutation outputs a corrected test pattern layout, wherein the test pattern layout has at least one structure representing a portion of the integrated circuit layout;
  b) code that simulates printing of each corrected test pattern layout; and
  c) code that analyzes each simulated printing to select one of the permutations of the at least one fragmentation parameter to apply to the integrated circuit layout prior to correction with the OPC simulation tool.

13. The program according to claim 12, wherein the optical proximity correction code of a) is embodied with the scripts of the OPC simulation tool.

14. The program according to claim 12, wherein the code of c) includes code to generate edge placement error (EPE) values with finer resolution than is used to generate EPE values as part of the optical proximity correction of b) and EPE values as part of the OPC simulation tool.

15. The program according to claim 14, wherein the fine resolution EPE values are indicative of a two dimensional relationship of the contour of simulated edge placement versus the original test pattern layout.

16. The program according to claim 12, wherein the test pattern layout is developed using factors selected from the group of design rules for the integrated circuit layout, design style for the integrated circuit layout, critical features of the integrated circuit layout, repeating structures of the integrated circuit layout, and combinations thereof.

17. The program according to claim 12, wherein the at least one fragmentation parameter is selected from the group of number of fragments, fragmentation length, simulation point location, fragmentation offset, allowable fragment movement, and combinations thereof.

18. The program according to claim 12, wherein the permutations of the iterative optical proximity correction further include at least one of a structure parameter relating to the test pattern layout and a process parameter relating to the photolithographic technique.

19. The program according to claim 12, wherein the code to analyze includes code to compare the simulated printing against specifications for the at least one structure of the test pattern layout.

20. The program according to claim 12, further comprising code to store each corrected test pattern layout and respective analysis results in a database.

* * * * *